United States Patent
Makovec

[19]

[11] 3,742,772
[45] July 3, 1973

[54] LINEAR MOTION ZERO ADJUSTER
[75] Inventor: Andrew M. Makovec, Livingston, N.J.
[73] Assignee: Weston Instruments, Inc., Newark, N.J.
[22] Filed: Aug. 12, 1971
[21] Appl. No.: 171,232

[52] U.S. Cl. .............................................. 74/18.2
[51] Int. Cl. ........................................... F16j 15/52
[58] Field of Search ................... 74/18.2, 18, 89.15

[56] References Cited
UNITED STATES PATENTS
2,949,036 8/1960 Ellis .................................. 74/18.2 X
3,216,264 11/1965 Lloyd ................................. 74/18.2

Primary Examiner—Charles J. Myhre
Assistant Examiner—F. D. Shoemaker
Attorney—William R. Sherman, Jerry M. Presson and Leonard R. Fellen et al.

[57] ABSTRACT

A zero adjust mechanism includes a shaft member arranged for axial movement within a tubular housing, with one end of said shaft extending out from one end of the housing and being adapted to be coupled to a meter movement. A bellows surrounds the portion of the shaft within the housing and a drive means is coupled to the other end of the shaft for imparting axial movement thereto in response to rotative movement of the drive means.

4 Claims, 5 Drawing Figures

INVENTOR.
Andrew M. Makovec
BY
Leonard R. Fellen
ATTORNEY

LINEAR MOTION ZERO ADJUSTER

This invention relates to hermetically sealed instruments and more particularly to a device for transmitting linear motion to a mechanism inside a hermetically sealed case.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

In certain instruments which include a sensitive measuring or indicating mechanism, for example, it is desirable that the mechanism be hermetically sealed against contamination from the surrounding media. Very often the construction of such instruments must provide a means for externally adjusting the sealed mechanism within. In addition, it is often desirable that the externally accessible adjusting means itself be restrained against lengthwise movement and the driven adjusting shaft be given a linear non-rotative motion. Further, space considerations may also limit the extent or degree of movement of the adjusting means as well as prohibit the use of complicated linkages in association therewith.

An object of the present invention is to provide an improved adjusting device for transmitting linear motion to a mechanism inside a hermetically sealed housing.

Another object of the present invention is to provide an adjusting device free of gears or unduly complicated linkages, comprising few components and which is easily adaptable for miniaturization and modification according to the size of the mechanism for which it is to be used.

Briefly described, the apparatus of the invention includes a shaft member arranged for axial movement within a tubular housing, with one end of said shaft extending out from one end of the housing and being adapted to be coupled to a meter movement. A bellows surrounds the portion of the shaft within the housing and a drive means is coupled to the other end of the shaft for imparting axial movement thereto in response to rotative movement of the drive means.

The novel features which are considered to be characteristic of the invention are set forth with particularity in the appended claims. The invention itself, however, both as to its organization and method of operation as well as additional objects and advantages thereof will best be understood from the following description when read in connection with the accompanying drawings in which:

Figure 1:
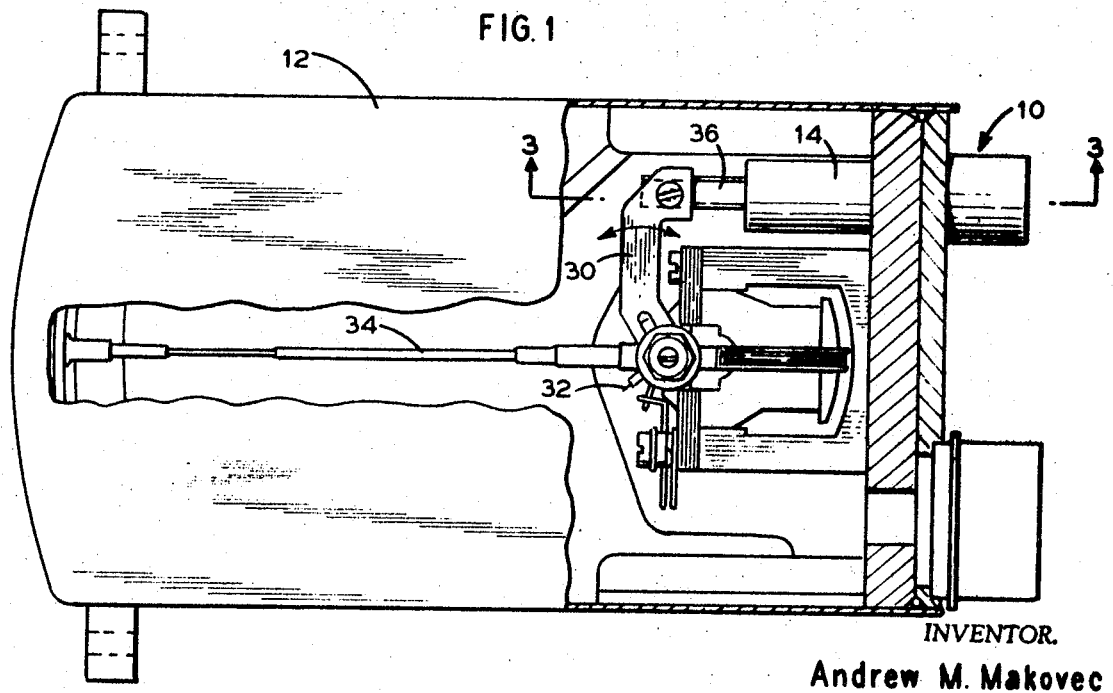
FIG. 1 is a top plan view of a zero adjust means in accordance with the present invention as utilized in association with a panel meter.

Referring now to the drawing and to FIG. 1 thereof, the adjusting apparatus 10 of the invention is shown in use as a zero adjust means for a panel type meter housed in a hermetically sealed casing indicated generally at 12. As shown more particularly in the perspective view of FIG. 2, the adjusting apparatus includes a tubular housing member 14, a push rod or shaft 16 arranged for linear travel in and out of the housing member at one end 18 thereof, an end cap member 20 seated in one end of the housing 18, a flexible bellows 22 received within the housing and surrounding the shaft 16 therein and which serves as a means for isolating the shaft from the environment an adjusting screw member 24 together with associated end thrust and retainer washers 26 and 28, and a cantilevered arm means 30 for coupling the longitudinal movement of the shaft 16 into a corresponding rotative movement of a zero adjust or centering spring 32 for the meter pointer 34.

With reference now to FIGS. 3, 4, 5 and FIG. 2, the outgoing end portion of the shaft 16 will be seen to be cut away to form a flat surface 36 and shoulder abutment 38. The other end of the shaft 16 is formed with two annular step portions 40 and 42 of successively lesser diameters. Also provided in this end of the shaft is an axially extending bore or aperture 44 threaded to receive the adjusting screw 24 in the assembly of the apparatus.

The housing member 14 is generally cylindrical in shape and includes at one end thereof, a peripheral shoulder 46 surrounding an enlarged screw threaded opening 48. Continuing from the opening 48 is a bore 50 of a slightly lesser diameter, extending axially along the housing member and merging into a smaller diameter opening 52 at the other end of the housing. An annular shoulder or lip 54 is formed inside the housing surrounding the opening 52 and provides a retaining means for component parts of the adjusting apparatus that are inserted through the opening 48 in the housing one end as will hereinafter be described.

Figure 3:
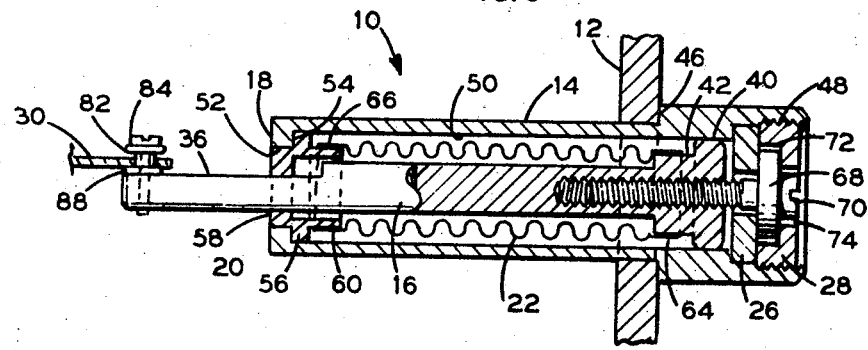
FIG. 3 is a front sectional elevation view of the zero adjust means taken along line 3—3 of FIG. 1.
Figure 4:
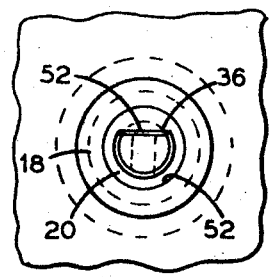
FIG. 4 is a left side view of the zero adjust means.
Figure 5:
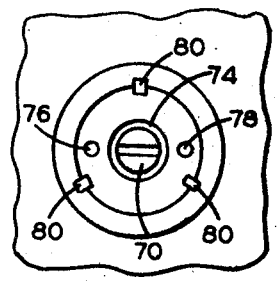
FIG. 5 is a right side view of the zero adjust means.
Figure 2:
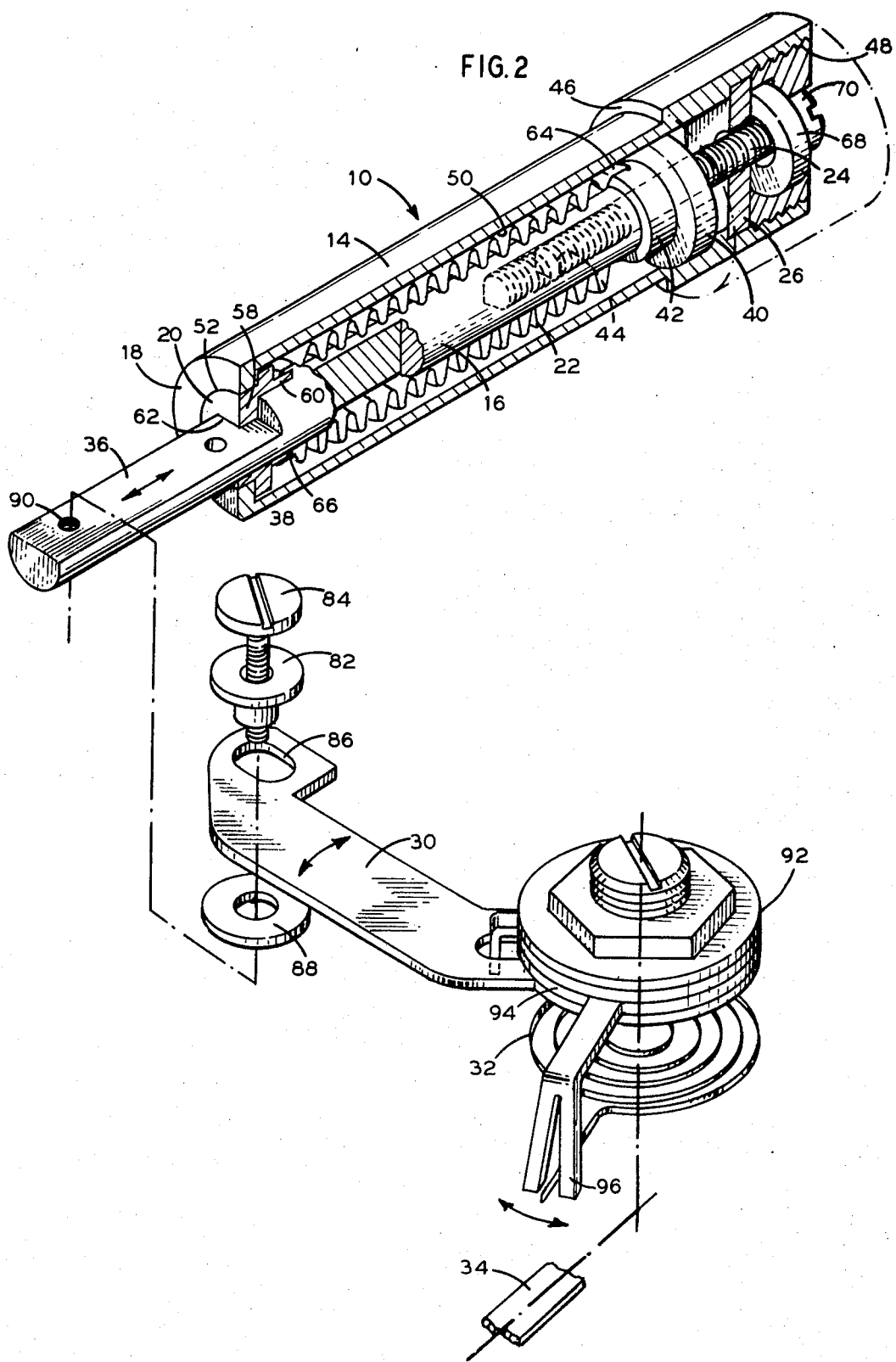
FIG. 2 is perspective view of the zero adjust means and showing the coupling thereof to a meter mechanism.

The end cap member 20 received within the housing is generally cylindrical in shape and includes an annular flange portion 56 intermediate of two circular boss end portions 58 and 60. As best shown in FIGS. 2 and 3, formed in one end of the cap member 20 is a semicircular keyway or aperture 62 conforming to and for receiving the flat end portion 36 of the shaft 16. The flange and boss portions are suitably dimensioned to allow the end cap to be slidably received within the housing bore 50 and the keyway end boss 58 to be captively seated within the housing end opening 52, with the flange 56 abutting the shoulder 54 in the housing.

Assembly of the apparatus of the invention is as follows.

The bellows member 22 is first positioned on the shaft 16 and coaxial therewith so that one end 64 thereof is seated on the lower step portion 42 at the end of the shaft that receives the adjusting screw 24. This end of the bellows is then hermetically sealed to the shaft step portion 42 in any desirable manner to provide a leakproof, non-rotatable connection. While this connection is preferably made by brazing with a high temperature metal or alloy, it will be understood that other sealing methods, as for example, soldering or the use of an epoxy may be employed in this stage of the assembly.

The end cap 20 is next slid over the shaft flat end 36 and moved there along until the other end 66 of the bellows is received over the end boss portion 60 and seated up against the flange 56. As was heretofore noted, the aperture 62 in the end cap 20 is keyed to conform to the flat end portion 36 of the shaft such that the end cap is free to slide back and forth along the length of the flat end portion of the shaft, but is constrained against rotative moment around the shaft. The bellows end 66 is then hermetically sealed to the end boss 60 of the cap 20 as by brazing or otherwise.

Next in the assembly of the adjusting apparatus, the bellows and shaft assembly is inserted into the housing bore 50 through the enlarged and threaded opening 48 and moved along the bore length to a position wherein the keyed boss end 58 is seated within the housing end opening 52, with a surface of the cap flange 56 abutting the annular shoulder 54 around the opening 52. With the bellows and shaft assembly thus placed, the boss 58 on the end cap is then fastened via some sealing means to the housing end portion so as to form a part thereof and provide a leakproof juncture therewith. It should be noted, that in this sealing operation, soldering or the use of an epoxy is preferred over brazing. The reason for this is that epoxy and solder materials generally have a lower melting point than brazing materials and as such in sealing the end cap to the housing thereis less likelihood of loosening or disturbing the other brazing joints in the apparatus.

Next in the assembly, a thrust washer 26 is inserted into the housing and seated on the back end surface of the shaft. The adjusting screw is then inserted through the washer 26 and into the complimentary threaded bore 44 in the shaft. To close off the opening 48 a screw threaded retainer washer 28 is provided.

It will be noted, and as shown in the Figures, that the adjusting screw 24 is capped by an integrally formed annular flange 68 and a slotted head portion 70. The retainer washer 28 is formed with an annular recess 72 generally conforming to the adjusting screw flange portion 68 and a coaxial aperture 74 for receiving the slotted head portion 70 of the adjusting screw.

The thrust washer 26 provides a bearing surface acting against the back side of the screw flange, and also functions to prevent inward movement of the screw. The retainer washer is screwed into the threaded opening in the housing such that the screw flange portion is seated within the recess 72 and the slotted head 70 is received in the aperture 74. To facilitate insertion of the washer 28 into the housing, two dimpled recesses 76 and 78 (FIG 5) for receiving a spanner wrench may be provided. Aside from closing the opening 48, the retainer washer functions to prevent outward movement of the screw during adjustment. Thus the two washers, i.e. the thrust and retaining washers thereby serve to hold the screw captive and prevent any longitudinal movement thereof.

To further lock the retainer washer in place as a closure for the housing opening 48, the peripheral threads of the housing opening may be upset in several places 80 as by staking or alternatively by the use of an epoxy or some other locking compound.

In the preferred embodiment illustrated, the assembled adjusting apparatus is installed through a suitable opening in an end wall of a casing which houses a meter mechanism with which the apparatus of the invnetion is to be utilized as a zero adjust means. In the embodiment illustrated, the adjusting apparatus housing 14 is inserted through an opening in a wall of a meter casing 12 such that the peripheral shoulder 46 of the housing 14 abuts the casing wall. The housing shoulder is then hermetically sealed to the casing wall to provide a leak tight connection. Thereafter, the arm means 30 is connected from the outwardly extending portion of the shaft 16 to the meter mechanism centering spring 32. More particularly, and as shown in FIG 2, fastening means in the form of a shouldered washer 82 and screw 84 is inserted through an elongated opening 86 in the arm member 30 and second washer 88 and then screwed into a tapped hole 90 in the outwardly extending end portion of the shaft 16. The other end of the arm is coupled either directly or by means of a clutch arrangement 92 wherein the arm end is coupled to a disc 94, which includes a depending tab projection 96 to which the outer end of the spiral meter spring 32 has been connected or affixed. The meter apparatus complete with the zero adjusting means of the invention can then be hermetically sealed in an outer casing to provide a complete sealing of the meter from an outside environment.

The operation of the zero adjust apparatus should be apparent from the FIGS. 1 and 2. By turning the screw head 70 clock-wise for example, the shaft 16 will be caused to move into the housing 14 thereby pivoting the arm member 30 also in a clock-wise direction as viewed in FIG. 2 such that the coupled spring outer end is also moved in a clock-wise direction thereby to adjust it as desired. Similarly, rotation of the adjusting screw head of the adjusting means in a counter clockwise direction will produce a counter clock-wise adjustment or rotation of the spiral spring end associated with the meter movement. It will also be apparent that with adjusting apparatus of the present invention as herein described, rotation of the adjusting screw occurs in place and is coupled to the coil spring in the meter movement to produce a rotative movement thereof and effect the zero correction desired.

With the apparatus constructed as described, the apparatus of the invention is free of any complicated linkages or gears and is easily adaptable for miniaturization and modification according to the size of the mechanism for which it is to be used.

What is claimed is:

1. A linear motion hermetically sealed zero adjuster apparatus for mounting in the case of a sealed instrument including in combination:
   an elongated shaft member;
   a tubular housing receiving therein for axial movement one end of said shaft member, the other end thereof extending outwardly from one end of said housing and being adapted to be coupled to the instrument within the case;
   a bellows positioned within said housing in surrounding relation and having one end hermetically sealed to the one end of said shaft member;
   means coupling the other end of said bellows to said tubular housing and providing a hermetic seal therewith while allowing for axial movement of said shaft;
   drive means coupled to said shaft member for imparting axial movement thereto in response to rotative movement of said drive means, a portion of said drive means being exposed through the other end of said housing to the exterior of said instrument case for rotary movement thereof;
   retaining means mounted on said housing for restraining said drive means against axial movement while allowing for rotary movement thereof.

2. The combination as defined in claim 1 wherein:

said drive means includes a screw member having a slotted head portion seated on a surrounding flange portion, and a threaded shank portion, said shaft member one end having an axially extending threaded bore receiving the shank portion of said drive-means, the flange portion of said drive-means being captively coupled to said retainer means so as to restrain said screw member against axial movement in response to rotation thereof.

3. The combination as defined in claim 2 wherein said other end of the housing includes stop means and wherein said retainer means includes:

a first washer seated within the other end of said housing and having an aperture which receives said screw member but is smaller than said flange portion thereof, said stop means engaging said first washer to prevent axial movement thereof toward said one end of the housing, said first washer acting as a bearing surface against the side of said flange portion facing said one end of the housing to limit axial movement of said flange portion and hence of of said screw member toward said one end of the tubular housing;

a second washer circumferentially surrounding said flange portion and having a portion facing the side of said flange portion which faces said other end of the housing and an aperture therein receiving the slotted head portion of said screw member; and means for fixing the position of said second washer within said housing other end and inhibiting axial movement thereof.

4. The combination as defined in claim 3 wherein the one end of said housing is formed with an inner lip portion surrounding an opening therein and wherein said coupling means includes an apertured cap member comprising a flange portion disposed between two annular bosses one of which is received within said end opening and hermetically sealed to said housing with said cap member flange portion being seated against said housing lip portion, the other end of said bellows being received around and hermetically sealed to said other boss, the other end of said shaft member being slidably received through said cap member aperture.

* * * * *